Figure 1:
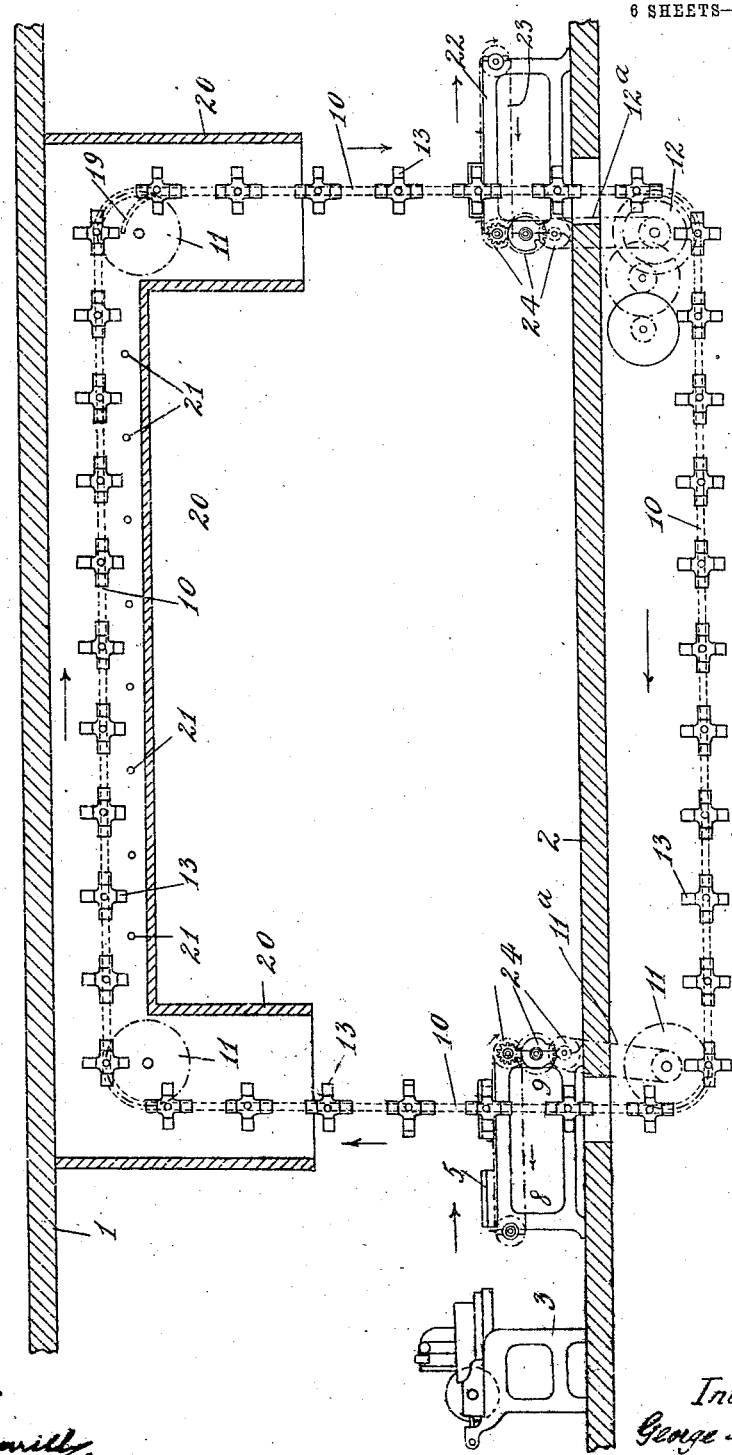

G. S. BAKER.
APPARATUS FOR TREATING DOUGH PREPARATORY TO BAKING.
APPLICATION FILED JULY 13, 1909.

1,109,894.

Patented Sept. 8, 1914.
6 SHEETS—SHEET 1.

Witnesses

Inventor
George Samuel Baker
by
Attorney

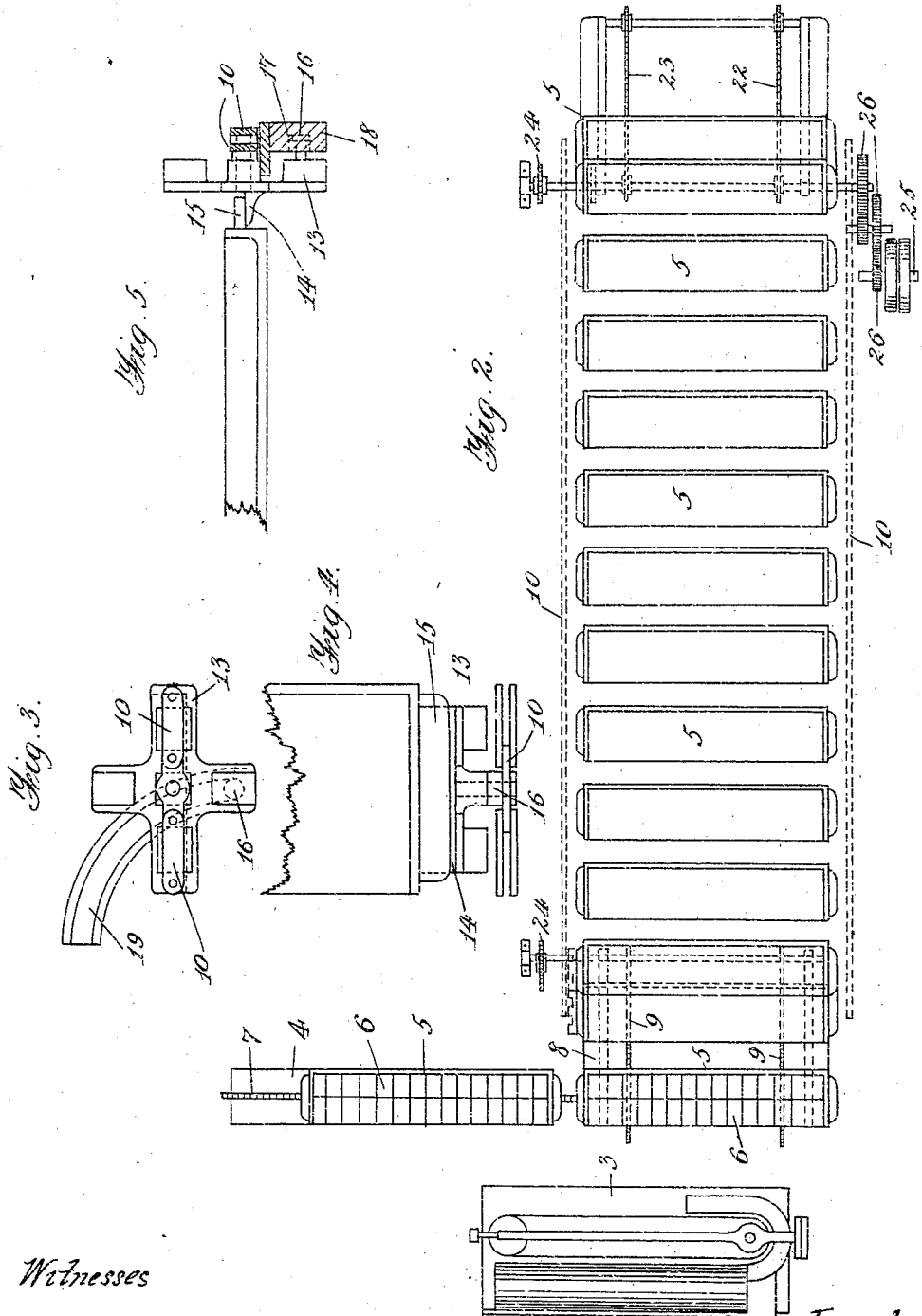

G. S. BAKER.
APPARATUS FOR TREATING DOUGH PREPARATORY TO BAKING.
APPLICATION FILED JULY 13, 1909.
1,109,894.
Patented Sept. 8, 1914.
6 SHEETS—SHEET 3.
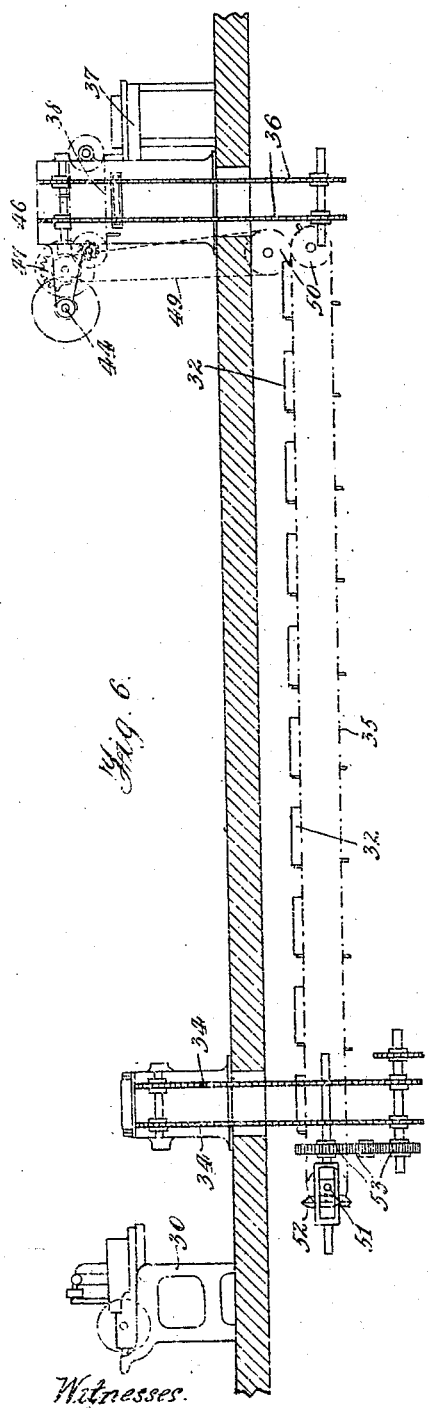
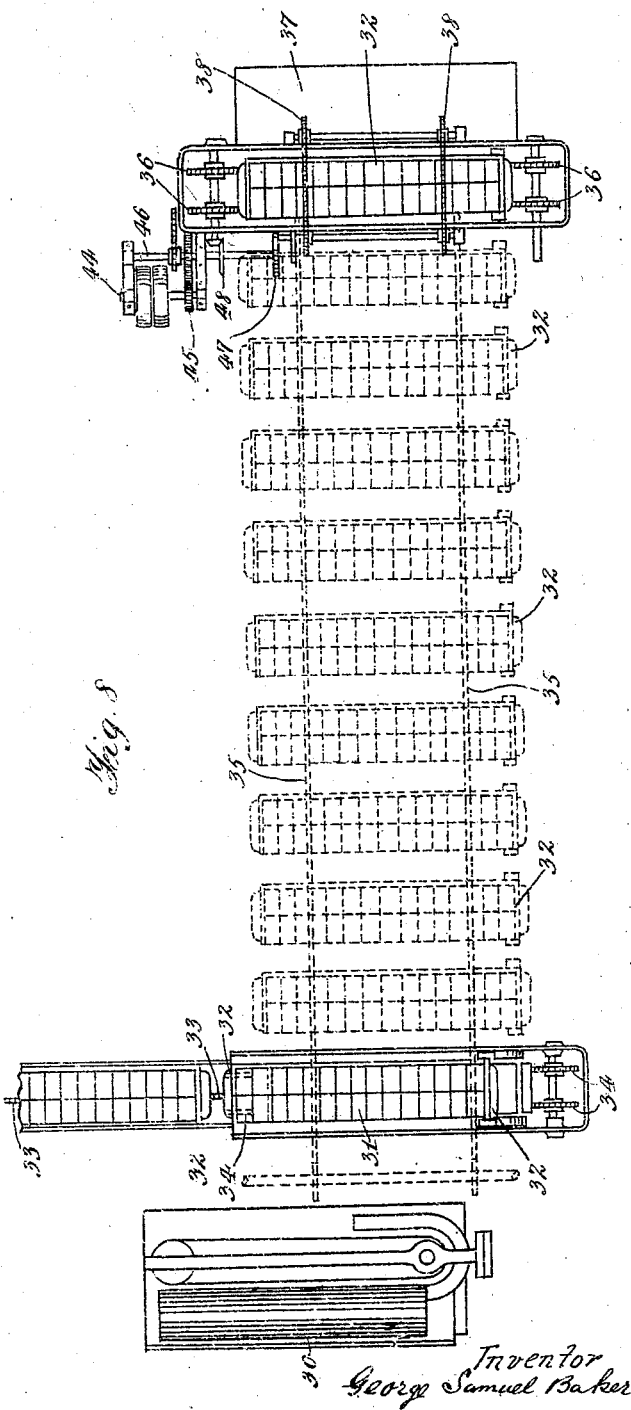
Witnesses.
Inventor
George Samuel Baker
by
Attorney

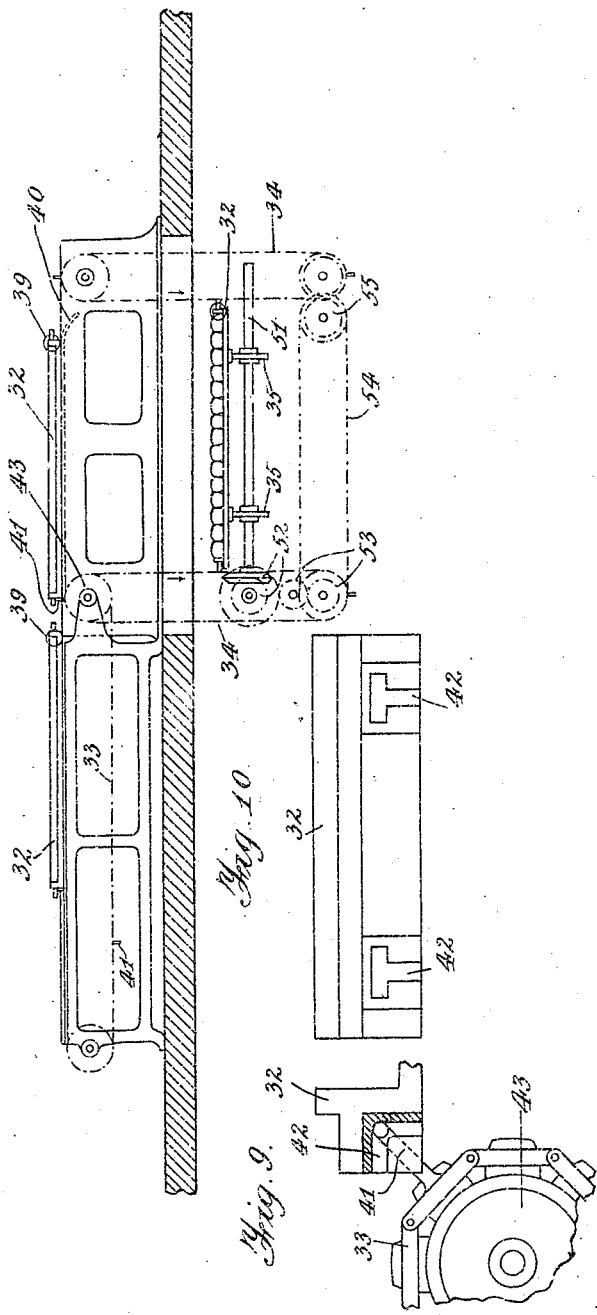

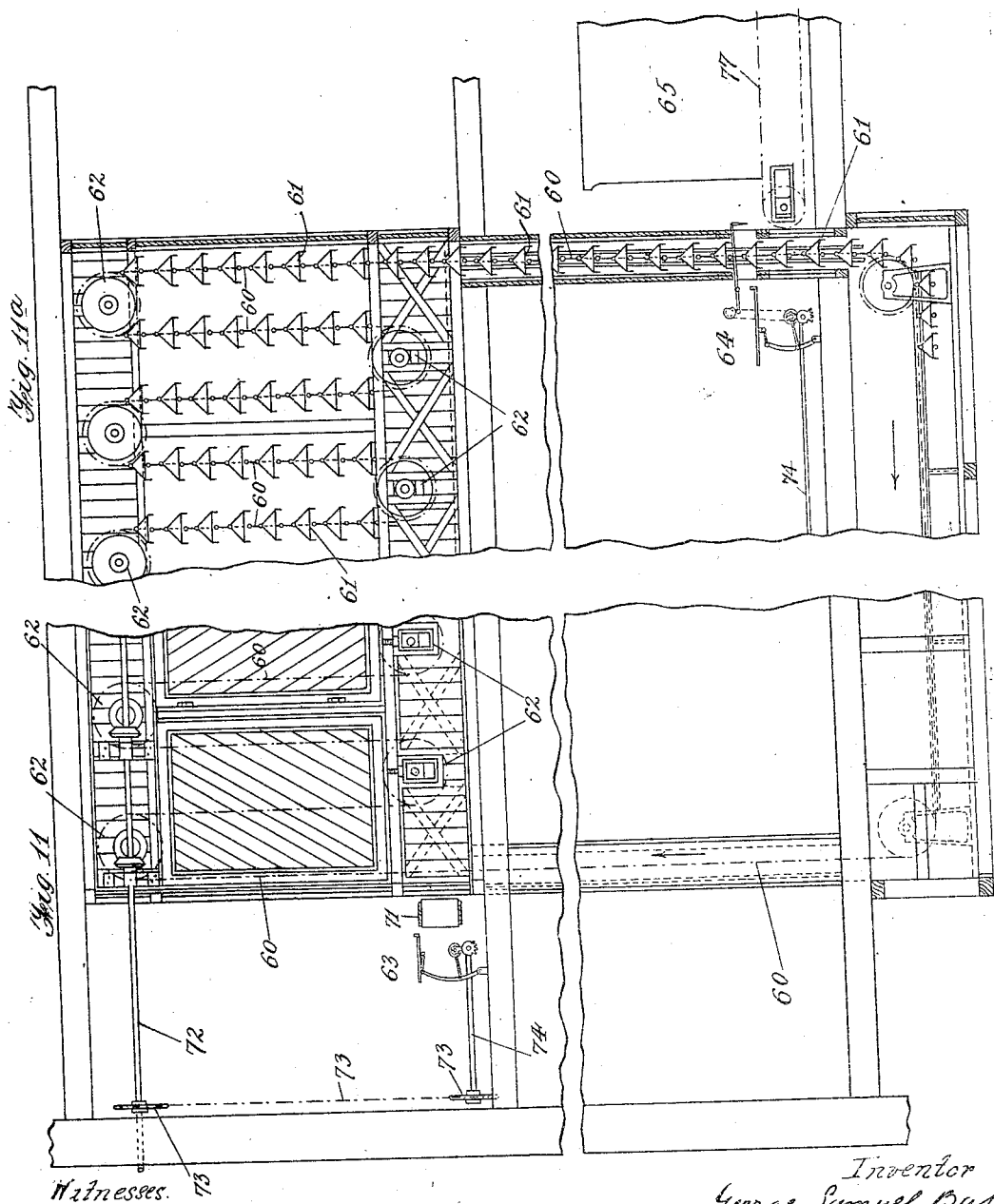

G. S. BAKER.
APPARATUS FOR TREATING DOUGH PREPARATORY TO BAKING.
APPLICATION FILED JULY 13, 1909.

1,109,894.

Patented Sept. 8, 1914
6 SHEETS—SHEET 6.

Witnesses

Inventor
George Samuel Baker
by
Attorney

UNITED STATES PATENT OFFICE.

GEORGE SAMUEL BAKER, OF LONDON, ENGLA..

APPARATUS FOR TREATING DOUGH PREPARATORY TO BAKING.

1,109,894.  Specification of Letters Patent.  Patented Sept. 8, 1914.

Application filed July 13, 1909. Serial No. 507,307.

*To all whom it may concern:*

Be it known that I, GEORGE SAMUEL BAKER, a subject of the King of England, residing at Willesden Junction, London, N. W., in England, have invented certain new and useful Improvements in Apparatus for Treating Dough Preparatory to Baking, of which the following is a specification.

This invention relates to apparatus for the treatment of dough preparatory to baking, and relates to apparatus concerned in the operation of "proving" said dough between the molding thereof and its introduction into the oven.

For the purpose of this invention I may use a molding apparatus of any desired or approved construction and preferably adjacent to the discharge end or portion thereof I provide one or a series of endless-belt or other conveyers on which are placed the known "setting" trays or boards on which the molded masses of dough either in tins or otherwise are placed in series or rows according to the capacity of said trays. The said conveyer carries the trays or boards with a comparatively slow continuous or intermittent movement (during which time they are filled with loaves to be proved) toward the proving apparatus proper, and when the end of the conveyer is reached suitable mechanism is brought into operation whereby a rapid lateral movement say at right angles to that of the conveyer is imparted to each tray in succession whereby it is transferred into or onto said proving apparatus. The mechanism for effecting this rapid lateral transfer is so arranged that a complete tray with its contents is fed to the prover before the next one on the conveyer comes into position and this may be effected in various ways, for example by interrupted gearing which produces one rapid lateral feed movement to one slow intermittent feed movement of the conveyer. The lateral movement may also take place during a certain extent of continuous feed of the conveyer, or again may be effected by means of a transverse chain, belt or equivalent provided with abutments or pushing members which through appropriate gearing operated for example by or from the conveyer feed mechanism, act on the trays to force them laterally at the desired times.

In one form the proving device comprises a single pair of chains with pivoted attachments for carrying trays, vertical and horizontal guides being provided for keeping the attachments and the trays thereon in the desired position during the travel of the chain in the various directions given to same and during its passage around the wheels or pulleys. These chains may pass up into a trunk or casing disposed immediately below the ceiling of the bakehouse or other chamber and then down again to a point where the trays are discharged for conveyance to the oven, the chains then returning below the floor to the starting point.

The trunk or casing can be provided with pipes for passage of a heating medium or free steam may be admitted to said trunk for the purpose of keeping the dough moist and at desired temperature during the proving process.

In another form the proving device comprises a conveyer band (or equivalent) traveling horizontally through a proving trunk, with an elevating and lowering device at each end, for raising or lowering the trays of dough to or from the trunk from the tray conveyer. In this form the conveyer may deliver directly into the path of the elevator, the elevator taking the place of the lateral transfer for this purpose and being actuated in the same manner as described for the lateral movement. Or a vertical trunk may be used in which the trays pass either up or down or both up and down in being proved. I do not limit myself to the particular arrangement, position or course which same is caused to travel since these features may be determined by the particular exigencies of the building or plant in question or other controlling circumstances. The proving trunks or devices may be made to operate in series.

Again instead of the single tins above referred to I may use grouped or interconnected tins which are dealt with in the manner above explained, and with their contents are fed into the oven. In this case the setting boards may be dispensed with, said groups of tins being directly handled by the conveyer and prover and further the molded loaves, or tins containing same, or interconnected groups of tins referred to may pass from one prover to another or others in series arranged in continuation of each other or relatively superposed and from the last prover be fed onto a transverse or cross transfer conveyer moving say at right angles to the prover (for instance by means similar to the transfer of the trays to the prover previously described) and which conveys them direct to the front or inlet portion of the oven which latter may be of the type in which the material to be baked travels continuously therethrough or of the ordinary draw-plate or other desired construction.

Embodiments of the invention given as examples are illustrated in the accompanying drawings in which—

Figure 12:
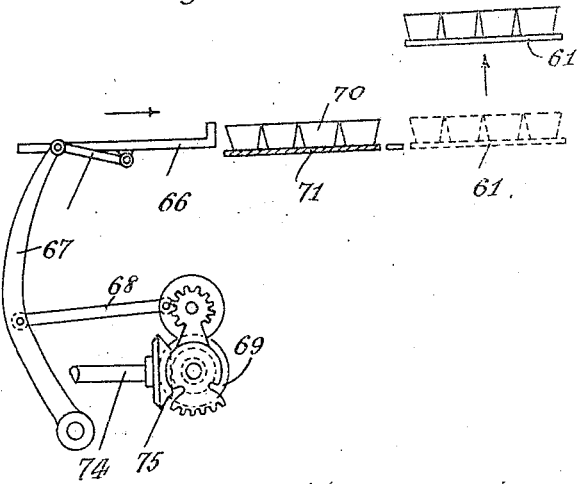
Figure 13:
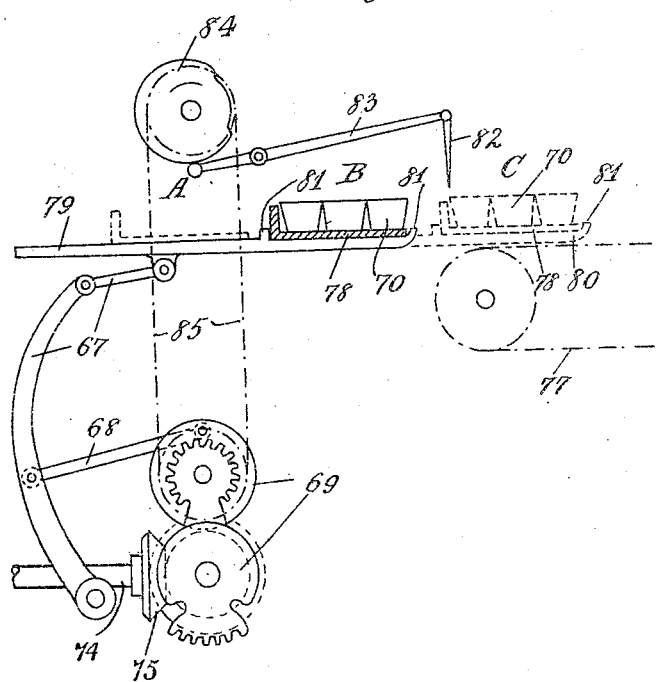

Figure 1 is a sectional elevation of one form of construction. Fig. 2 is a plan view thereof. Figs. 3, 4 and 5 are detail views of parts shown in Figs. 1 and 2. Fig. 6 is a sectional side elevation of another form of construction. Fig. 7 is a sectional end elevation thereof and Fig. 8 a plan view. Figs. 9 and 10 are detail views of parts relating to Figs. 6, 7 and 8. Fig. 11 is a vertical elevation of one end of apparatus comprising another form of construction. Fig. 11ª is a similar view of the opposite end of said apparatus, and Figs. 12 and 13 are detail views of mechanisms included in the construction shown in said Figs. 11 and 11ª.

Referring to Figs. 1 to 5, 1 designates the ceiling of the bakehouse or the like and 2 the floor thereof on which is placed the molding machine 3 of any known or appropriate construction. Adjacent said machine is a conveyer table or the like 4 whereon are placed the setting boards or trays 5 containing the tins 6 for reception of the molded masses of dough to be proved and which are fed along said table for example by a chain or the like 7 in the known manner. From said table 4 the trays 5 are passed to a cross transfer table 8 where they are acted upon by abutments on chains 9 driven, in a direction laterally of that described, to transfer said trays to the endless conveyer or "proving" chains 10. As shown the latter are arranged to have two vertical and two horizontal runs, whereby they are carried up to near the ceiling, and extend along the latter, then down below the floor back to the starting position, passing around suitable guiding and driving pulleys 11 and 12 respectively. Pivotally mounted on the chains are attachments 13 of cruciform shape each having a ledge 14 on which the usual lugs 15 of the trays rest and provided also with a pin or roller 16 which travels in a groove 17 in a guide 18 the latter being disposed preferably both adjacent the vertical and horizontal runs of the chains but not being so shown in Fig. 1 for the sake of clearness of illustration. To insure the trays always remaining in a horizontal position in spite of the changing position of the chains, at the required points where the chains pass around the guiding or driving pulleys aforesaid a curved guide 19 eccentric to the pulley is provided (see Fig. 3 and right hand top corner of Fig. 1) into which the rollers 16 are deflected. As shown the chains 10 may pass through a trunk 20 secured to the ceiling, said trunk containing a series of steam pipes 21.

It will be seen that the trays fed from the table 8 to the chains 10 are carried by the latter in the direction of the arrows up and through the trunk 20, where such is provided, then down again to a discharge or delivery table 22 provided with laterally driven chains 23 similar to those 9 previously referred to for removing the trays from the chains 10, the latter returning empty below the floor to the transfer table 8. Intermittent motion is imparted to the chains 9 and 23 for example by means of interrupted gearing 24 driven from the shafts of the pulleys 11 and 12 by chains 11ª and 12ª in such a manner as to feed or remove the trays on to or from the chains 10 at the required times and speed.

25 indicates the main driving or pulley shaft from which motion is imparted to the shaft of the driving pulley 12 at the desired speed by means of a train of gearing 26.

Referring now to the construction shown in Figs. 6 to 10, 30 designates the molding machine from which the molded masses are conveyed to the tins 31 on the boards or trays 32 the latter being conveyed along by the chains 33 directly to a lowering device comprising two pairs of chains 34 having suitable supports for the trays and extending through the floor of the bakehouse. The said lowering device conveys and transfers the trays to a horizontal conveyer comprising a pair of chains 35 below the floor and this latter conveys and transfers the trays to a lifting device comprising pairs of chains 36 constructed and arranged similarly to the lowering device referred to. The said chains 36 carry the trays up through the floor again to a delivery or discharge table 37 onto which they are delivered by lateral or cross transfer chains 38 having lugs or abutments acting from above on the edges of the trays.

In order to efficiently and properly transfer the trays from the horizontal to the vertical series of conveyer chains for instance from the conveyer chains 33 to the lowering chains 34 I may provide the trays at one end with rollers or wheels 39 adapted to travel on tracks 40 curved at the ends adjacent one pair of said chains 34 and the lugs or abutments 41 on the chains 33 are caused to engage angular guides or slots 42 at the other end of the tray the construction and action being such that as the chains 33 travel around the guide rollers 43 the tray is carried through the curved path necessary to transfer them to the lowering chains 34. Any convenient mechanism may be used for driving the various chains and conveyers that shown in the drawings comprising a pulley shaft 44 driving through gearing 45 a shaft 46 the latter driving interrupted gearing 47 for operating the cross transfer chains 38 and bevel gear 48 on said shaft 46 driving the lifting chains 36. Shaft 46 also drives through belt or chain 49 gearing 50 which drives the conveyer chains 35 below the floor and at the opposite end of the apparatus said chains drive through shaft 51 bevel gear 52 and spur gear 53 the lowering chains 34 the two pairs thereof being coupled by chain 54 and gears 55. The pairs of lifting chains may be similarly coupled.

In the construction shown in Figs. 11 to 13 the proving means proper is of a substantially known type comprising chains 60 carrying pivoted shelves or supports 61 for reception of the trays or boards or the grouped and integral series of tins before referred to. Said chains pass alternately upward and downward about pulleys 62 and according to this form of the present invention are passed under the floor of the bakehouse or other chamber, as shown, extending at one side or end of the apparatus past a novel form of feed device 63 and at the other side or end past a novel form of delivery or discharge device 64 which latter may convey the trays or groups of tins directly to the oven 65.

The feed device more particularly shown in Fig. 12 and which may be used for either trays or grouped tins but shown as acting in conjunction with the latter comprises a slide or pushing member 66 adapted to be given rectilinear horizontal movement at the required times by means of the levers 67, rod 68 and interrupted gearing 69 whereby the groups of tins 70 is pushed off the conveyer 71 directly onto the shelves or supports 61 of the proving chains 60. The gearing 69 is driven for example from the shaft 72 which drives said chains 60 by means of chain and chain wheels 73, shaft 74 and bevel gearing 75.

Where grouped tins only are being dealt with a similar mechanism to that just described may be used to deliver same from the chains 60 to the oven 65 which in the form shown comprises a traveling endless belt 77. Where however trays or boards 78 with the tins thereon are used it is necessary to use the device more particularly shown in Fig. 13. In this construction the slide 79 is operated in a similar manner to slide 66 described with reference to Fig. 12 but carries the tray 78 on a forward extension 80, lugs 81 holding the tray in place. Above the slide is a finger or plate 82 mounted on a lever 83 the movements of which are controlled by a cam 84 operated from the interrupted gearing 69 by means of a chain 85.

In operation the slide rests in position B after the tray has been deposited on the slide by the chains 60; the interrupted gearing then operates the levers 67 and moves the slide forward to position C whereupon the finger or plate 82 descends behind the tins 70 and remains in this position whilst the slide is moved back, thus stripping the tins off onto the oven belt 77. The slide moves back to position A where the tray is removed and is then again moved forward to position B where it is ready to receive the next tray.

I do not limit myself to the particular arrangement and construction of parts of the various embodiments of the invention hereinbefore described since the same may be varied within limits determined by the following claims without departing from the spirit of the invention, but—

What I claim as my invention and desire to secure by Letters Patent of the United States is:—

1. An apparatus for proving dough preparatory to baking, comprising a main endless conveyer provided with supports for setting boards, means for feeding setting boards to said main conveyer comprising an endless feeding conveyer positioned for movement in a direction rectangular to said main conveyer, means for transferring the boards from said feeding conveyer to said supports comprising an endless feed conveyer adapted for movement in a direction rectangular to said main conveyer, means for discharging the setting boards from said main conveyer comprising an endless discharge conveyer adapted for movement in a direction similar to that of said second feed conveyer, and means for intermittently driving the second feed and discharge conveyers.

2. An apparatus for proving dough preparatory to baking, comprising a main endless conveyer provided with supports for setting boards and passing through vertical and horizontal courses, means whereby the setting boards are positively maintained in horizontal position in passing from one course to another, means for feeding setting boards to said main conveyer comprising an endless feeding conveyer positioned for movement in a direction rectangular to said main conveyer, means for transferring the boards from said feeding conveyer to said supports comprising an endless feed conveyer adapted for movement in a direction rectangular to said main conveyer, means for discharging the setting boards from said main conveyer comprising an endless discharge conveyer adapted for movement in a direction similar to that of said second feed conveyer, and means for intermittently driving the second feed and discharge conveyers.

3. An apparatus for proving dough preparatory to baking, comprising a main endless conveyer comprising a pair of parallel endless chains provided with supports for setting boards, means for feeding setting boards to said main conveyer comprising an endless feeding conveyer positioned for movement in a direction rectangular to said main conveyer, means for transferring the boards from said feeding conveyer to said supports comprising an endless feed conveyer positioned between the chains of the main conveyer and adapted for movement in a direction rectangular to said main conveyer, means for discharging the setting boards from said main conveyer comprising an endless discharge conveyer positioned between the chains of the main conveyer and adapted for movement in a direction similar to that of said second feed conveyer, and means for intermittently driving the second feed and discharge conveyers.

In witness whereof I have signed this specification in the presence of two witnesses.

GEORGE SAMUEL BAKER.

Witnesses:
ALFRED NUTTING,
PERCY PHILLIPPS.